(12) United States Patent
Popick et al.

(10) Patent No.: US 11,100,129 B1
(45) Date of Patent: Aug. 24, 2021

(54) PROVIDING A CONSISTENT VIEW OF ASSOCIATIONS BETWEEN INDEPENDENTLY REPLICATED DATA OBJECTS

(71) Applicant: Amazon Technologies, Inc., Seattle, WA (US)

(72) Inventors: Daniel Stephen Popick, Seattle, WA (US); Alazel Acheson, Redmond, WA (US); Jasmeet Chhabra, Bellevue, WA (US); Luke Edward Kennedy, Seattle, WA (US); Meng Li, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 575 days.

(21) Appl. No.: 15/967,446

(22) Filed: Apr. 30, 2018

(51) Int. Cl.
*G06F 16/00* (2019.01)
*G06F 16/27* (2019.01)
*G06F 16/23* (2019.01)

(52) U.S. Cl.
CPC .......... *G06F 16/27* (2019.01); *G06F 16/2365* (2019.01)

(58) Field of Classification Search
CPC .............. G06F 16/184; G06F 16/1844; G06F 16/2471; G06F 16/25; G06F 16/258; G06F 16/275; G06F 16/28; G06F 16/283; G06F 16/955; G06F 2212/1016; G06F 3/06; G06F 3/0607; G06F 3/0611; G06F 3/0613; G06F 3/0617; G06F 3/0659; G06F 3/0686; G06F 3/0689; G06F 7/00; G06F 9/45558; G06F 9/5077; G06F 9/5083; G06F 11/00; G06F 11/076; G06F 11/1084; G06F 11/1448; G06F 11/1458; G06F 11/1658; G06F 12/0253; G06F 15/167; G06F 15/17331; G06F 16/134; G06F 16/183; G06F 16/2255; G06F 16/2282; G06F 16/2315; G06F 16/2379; G06F 16/24565; G06F 16/256; G06F 16/90; G06F 2009/45595; G06F 2201/855; G06F 2211/104; G06F 2212/1044; G06F 3/0635; G06F 3/0647; G06F 11/0754; G06F 11/079; G06F 11/0796; G06F 11/14; G06F 11/2056; G06F 11/3006; G06F 11/3058; G06F 11/3089; G06F 11/3409; G06F 11/3419;
(Continued)

(56) References Cited

U.S. PATENT DOCUMENTS 6,049,809 A  4/2000 Raman et al.
8,131,723 B2  3/2012 Sim-Tang
(Continued)

*Primary Examiner* — Yicun Wu
(74) *Attorney, Agent, or Firm* — Robert C. Kowert; Kowert, Hood, Munyon, Rankin & Goetzel, P.C.

(57) ABSTRACT

A consistent view of associations between independently replicated data objects may be provided. Data objects may be stored in separate data stores. Copies of the data stores may also store the data objects. The copies of the data stores may independently receive the data objects to be stored as part of independently replicating data stores to one or more copies of the data stores. An association can be created between objects in the different data store. If when the association is created it is determined that a referenced object is not yet stored in a copy of a data store, then both the association and the referenced object may be stored in the same data store so that the association and the referenced object are replicated together to a copy of the same data store.

20 Claims, 11 Drawing Sheets

(58) Field of Classification Search
CPC .. G06F 11/3447; G06F 11/3495; G06F 12/00; G06F 12/0284; G06F 12/0868
See application file for complete search history.

(56) References Cited

U.S. PATENT DOCUMENTS

| | | |
|---|---|---|
| 9,098,470 B2 | 8/2015 | Calder et al. |
| 2011/0231578 A1* | 9/2011 | Nagappan ............. H04L 45/586 709/248 |
| 2014/0023076 A1* | 1/2014 | Calo ....................... H04L 45/34 370/392 |
| 2017/0262191 A1* | 9/2017 | Dewakar ............... G06F 3/0689 |
| 2019/0294582 A1* | 9/2019 | Zhu ......................... G06F 3/065 |

* cited by examiner

PROVIDING A CONSISTENT VIEW OF ASSOCIATIONS BETWEEN INDEPENDENTLY REPLICATED DATA OBJECTS

BACKGROUND

Implementing multiple copies of data sets increases both the availability and durability of data stored within the data sets. Replication techniques, for instance, can be implemented to update data set copies with the latest changes or information added to the data sets. In some scenarios, data stored in different data sets may become related or otherwise associated. These relations or associations may also be replicated to data set copies. Thus, consistency requirements between copies of data sets may be increased as consistency may include replicating changes to provide internal consistency with respect to changes made to an individual data set and external consistency with respect to changes made that associate multiple data sets. Techniques that can provide both internal consistency for an individual data set and external consistency across a data set may be highly desirable.

Figure 1:
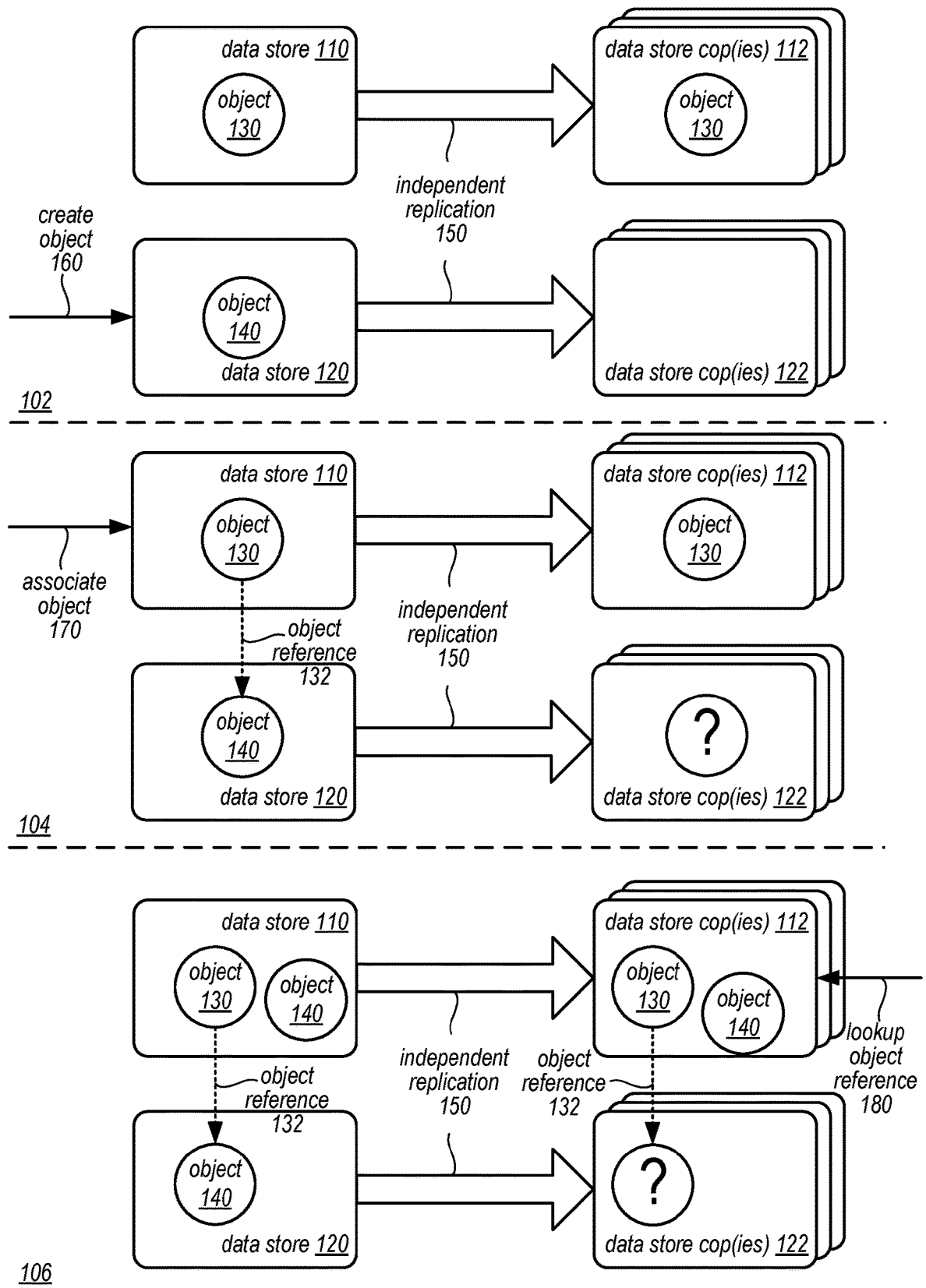
FIG. 1 is a logical block diagram illustrating providing a consistent view of associations between independently replicated data objects, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments of providing a consistent view of associations between independently replicated data objects are described herein. A consistent view of associations between independently replicated data objects may ensure that an association that is created between objects in different data stores (e.g., a link or other reference that attaches a "policy" object in a "policy store" to a "person" object in a "directory store") is not replicated to respective copies of the data stores (e.g., a policy store copy and a directory store copy in a different location) before the associated objects are replicated, in some embodiments, which could result in an inconsistent view (e.g., the attachment of the policy to a user would be visible in the copy of the directory store before the policy is replicated to the copy of the "policy store"). Inconsistent views, for instance, could break, halt, or provide invalid results to client systems which may rely upon a consistent view of the associations in order to operate correctly, in some embodiments.

FIG. 1 is a logical block diagram illustrating providing a consistent view of associations between independently replicated data objects, according to some embodiments. As illustrated in scene 102, a data store 110 may store a data object 130, in some embodiments. Data store 110 may implemented as various types of data stores, such as various kinds of databases (e.g., including relational, non-relational, graph, document, etc.), file systems, or other object stores (e.g., key value stores), in some embodiments. Similarly, data store 120 may be implemented to store data objects as well and may be of the same (or different) type of data store, in some embodiments. Copies of the data stores may be maintained, in various embodiments, such as data store cop(ies) 112 of data store 110 and data store cop(ies) 122 of data store 120. For example, data store cop(ies) 112 and 122 may be stored in different locations (e.g., across data centers or network regions) to distribute the likelihood of common failures from preventing access to or otherwise losing data stored in data stores 110 and 120. In some embodiments, cop(ies) 112 and 122 may be implemented to increase the availability of data stored within data stores 110 and 120 (e.g., to provide faster network access to data to clients that are physically located closer, in terms of network hops, to data store cop(ies) 112 and 122 instead of data stores 110 and 120).

Replication techniques 150 or mechanisms may be implemented for data stores 110 and 120 to independently copy or otherwise replicate changes to data stores 110 and 120 to cop(ies) 112 and 122, in some embodiments. For example, data stores 110 may implement a change log or other stream of changes that is updated as updates are made to data store 110 (e.g., a binlog stream of a MySQL database) which may be sent to and replayed at data store cop(ies) 112, in some embodiments. Similarly, data store 120 may implement the same (or different) replication techniques to replicate changes (e.g., by utilizing a separate replication service, as discussed below with regard to FIGS. 2 and 5). Independent replication may provoke, as discussed above, scenarios where dependencies across data stores 110 and 120 could be replicated out of order (e.g., violating a logical consistency between associated data objects), in some embodiments. For example, as illustrated in scene 102, a request 160 to create an object at data store 120, object 140, may be received and performed at data store 120, in some embodiments. Depending on when object 140 is replicated to data store cop(ies), associations with object 140 could become inconsistent when accessed through data store cop(ies) 112 and 122 (as opposed to data stores 110 and 120), in some embodiments.

For example, scene 104 illustrates a scenario where a request 170 to associate object 130 with object 140 is received. A reference 132 may be stored (e.g., a pointer, identifier, location, link, or other information that allows a query or other lookup with respect to object 130 to identify object 140 as referenced by object 130) in data store 110. However, because object 140 is replicated independently to data store cop(ies) 122, there is a possibility that object reference 132 could arrive via independent replication at data store cop(ies) 130 before the referenced object, object 140 is replicated to data store cop(ies) 122. In order to ensure that object reference 132 is not replicated without becoming visible at data store cop(ies) 112 in a way that is inconsistent (e.g., referencing an object in data store cop(ies) 122 that does not exist), a copy of the referenced object, object 140 may be stored in data store 110 in order to replicate both the object reference 132 and referenced object 140 together, in some embodiments, as illustrated in scene 106. For example, tracking or other information that indicates the state of data store cop(ies) 112 and 122 may be maintained which indicates those updates that have been replicated to the cop(ies). If it is determined based on the tracking information that the object 140 is not yet present in data store cop(ies) 122, then the object 140 may be stored in data store 110 so as to be replicated together with object reference 132 according to the replication technique or mechanism that replicates changes from data store 110 to data store cop(ies) 112. In scenarios where data store cop(ies) 122 is known to store object 140, then only the reference 132 may be stored in data store 110, in some embodiments, so that additional storage at data store cop(ies) is not consumed unless the inconsistency would possibly occur.

By storing a copy of a referenced object along with the reference to the object in order to replicate the reference and referenced object together, the time or latency of performing requests such as the associate object request 170 is not increased in order to ensure that a consistent view of the association is visible in data store cop(ies) 112 and 122, increasing the speed at which changes are replicated from data stores to data store copies and the speed at which a consistent view of the data is available at the copies for used by clients. For example, providing a consistent view of associations between independently replicated data objects as discussed in the techniques above and below may ensure that the independence of the replication techniques 150 for data stores 110 and 120 is not disrupted or removed, and replaced with a more complex and less performant synchronization method which could slow down the processing of requests such as associate object request 170 and increase the amount of time before an object and association becomes visible at data store cop(ies) 112 and 122. A lookup object reference request 180 may, for instance be received at one or more of data store cop(ies) 112, in some embodiments. The request 180 may specify object 130 and its referenced objects (e.g., object 140). Even though referenced object 140 may not have arrived in data store cop(ies) 122, data store cop(ies) 112 can provide a consistent view of object 130 and its referenced objects because object 130 would not reference an object that is not available to be returned in response to the lookup request. In various embodiments, systems that perform or otherwise implement providing a consistent view of associations between independently replicated data objects may experience better performance in processing requests to associate objects, for instance, across independently replicated data stores.

Please note, FIG. 1 is provided as a logical illustration of providing a consistent view of associations between independently replicated data objects, and is not intended to be limiting as to the physical arrangement, size, or number of components, modules, or devices, implementing a data store, data object, data store copy, replication technique or requests.

The specification first describes an example of a provider network that implements providing a consistent view of associations between independently replicated data objects in a network-based data storage service, according to various embodiments. Included in the description of the example directory storage service are various aspects of the provider network along with other services which may, for instance, implement replication between data stores hosted in the data storage service. The specification then describes a flowchart of various embodiments of methods for implementing providing a consistent view of associations between independently replicated data objects. Next, the specification describes an example system that may implement the disclosed techniques. Various examples are provided throughout the specification.

Figure 2:
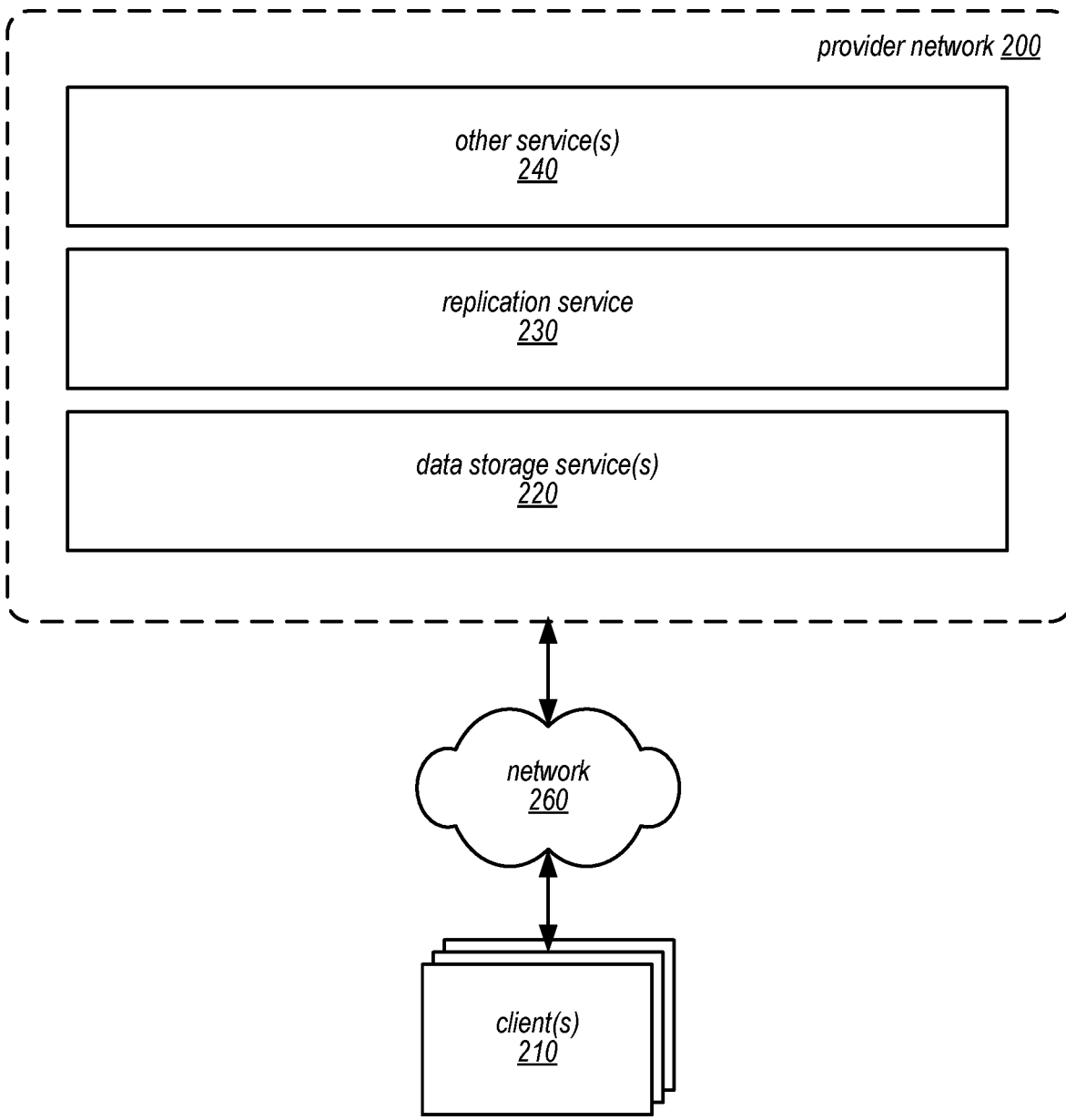
FIG. 2 is a logical block diagram illustrating a provider network that implements a storage service that provides a consistent view of associations between independently replicated data objects, according to some embodiments.

FIG. 2 is a logical block diagram illustrating a provider network that implements a storage service that provides a consistent view of associations between independently replicated data objects, according to some embodiments. Provider network 200 may be set up by an entity such as a company or a public sector organization to provide one or more services (such as various types of cloud-based computing or storage) accessible via the Internet and/or other networks to clients 210. Provider network 200 may include numerous data centers hosting various resource pools, such as collections of physical and/or virtualized computer servers, storage devices, networking equipment and the like (e.g., computing system 2000 described below with regard to FIG. 11), needed to implement and distribute the infrastructure and services offered by the provider network 200. In some embodiments, provider network 200 may be implemented across one or more regions (e.g., collections of resources in separate geographic locations) which may only be accessible via public network connections (e.g., over the Internet). For example, the replication techniques described below may provide replication across regions so that the copies of a data store for which providing a consistent view of associations between independently replicated data objects may be performed are hosted in a region different than the source data stores at which the changes were initially performed, in some embodiments.

Figure 6:
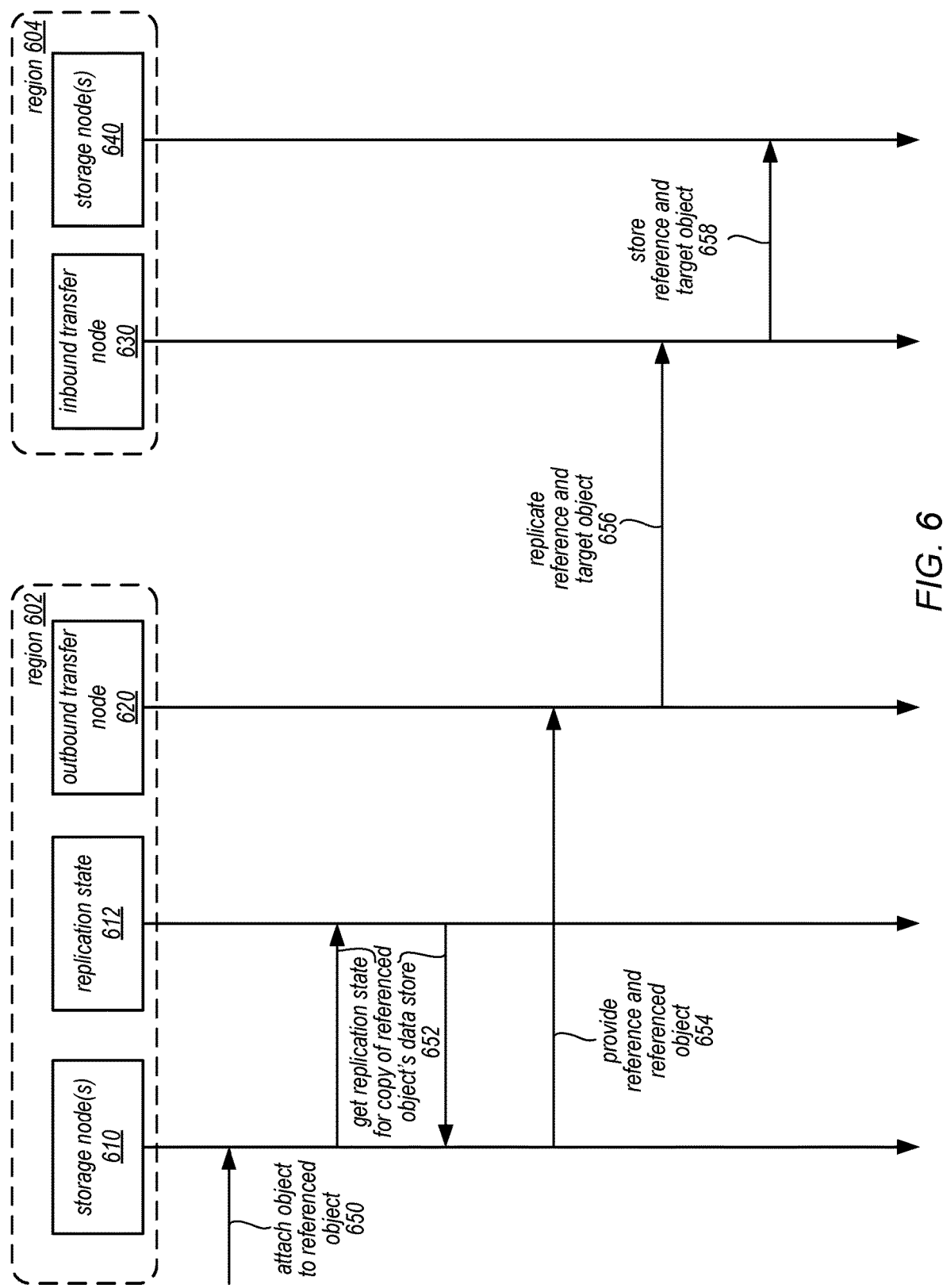
FIG. 6 is a logical block diagram illustrating interactions to attach a referenced object, according to some embodiments.
Figure 8:
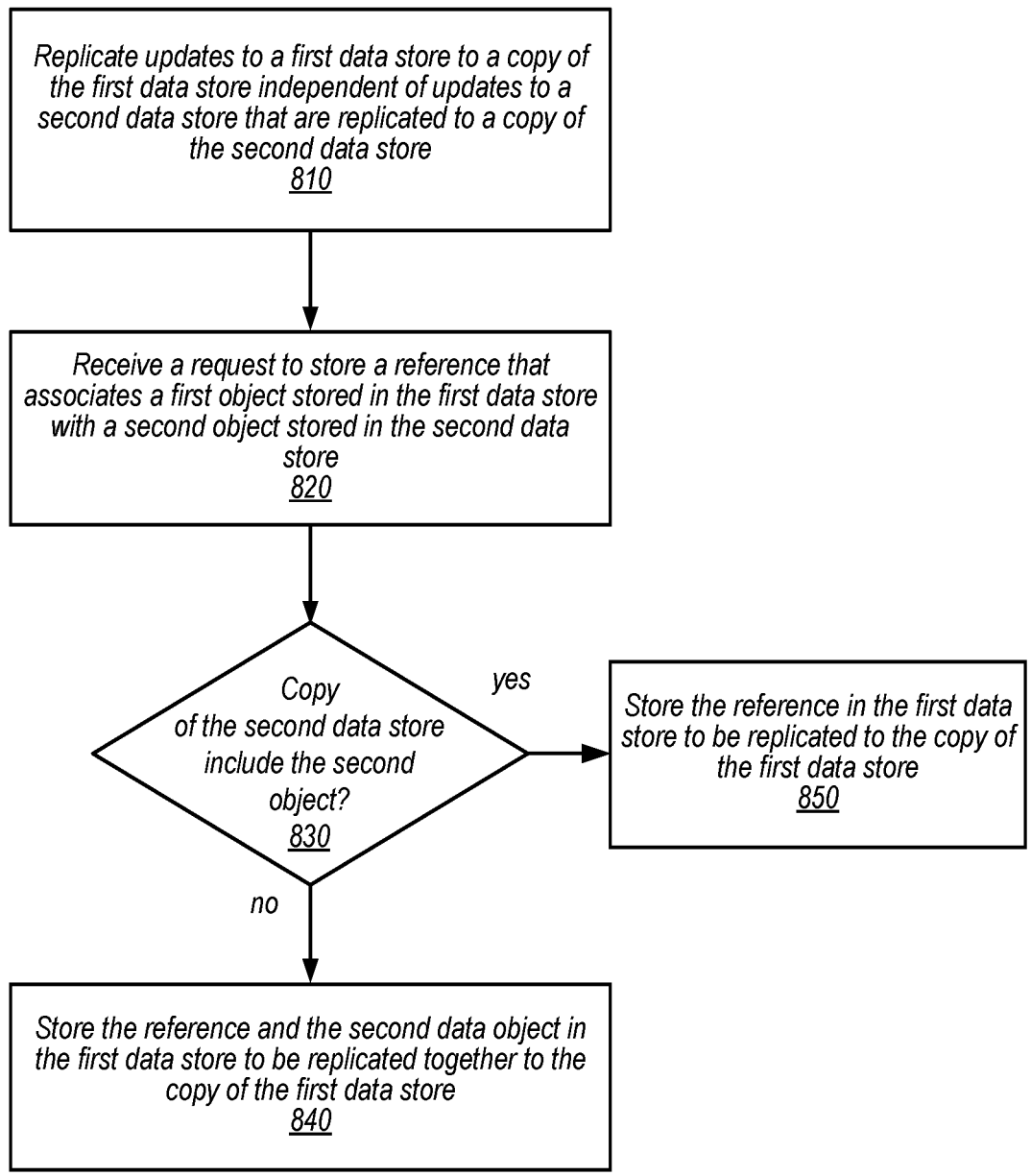
FIG. 8 is a high-level flowchart illustrating methods and techniques implement providing a consistent view of associations between independently replicated data objects, according to some embodiments.

In some embodiments, provider network 200 may implement a data storage service(s) 220, provide other computing resources or services, a replication service 230 for replicating data from data stores hosted in different locations (e.g., across provider network regions), and/or other service(s) 240, which may include various other types of virtual computing resources, storage, processing, analysis, communication, event handling, visualization, and security services (which may implement applications that perform updates such as the creation of objects or association of objects to data objects hosted in data storage service 220, in some embodiments, as discussed above with regard to FIG. 1 and below with regard to FIGS. 6 and 8. Clients 210 may access these various services offered by provider network 200 via network 260. Likewise network-based services may themselves communicate and/or make use of one another to provide different services.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 11 and described below. In various embodiments, the functionality of a given service system component (e.g., a component of the data storage service 220 or a component of the replication service 230) may be implemented by a particular node or may be distributed across several nodes. In some embodiments, a given node may implement the functionality of more than one service system component (e.g., more than one database service system component).

Clients 210 may encompass any type of client that can submit network-based services requests to provider network 200 via network 260, including requests for directory services (e.g., a request to create or modify a graph data structure to be stored in directory storage service 220, etc.). For example, a given client 210 may include a suitable version of a web browser, or may include a plug-in module or other type of code module that can execute as an extension to or within an execution environment provided by a web browser. Alternatively, a client 210 may encompass an application such as a database application (or user interface thereof), a media application, an office application or any other application that may make use of persistent storage resources to store and/or access one or more graph data structures to perform techniques like organization management, identity management, or rights/authorization management. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 210 may be an application that can interact directly with network-based services platform 200. In some embodiments, client 210 may generate network-based services requests according to a Representational State Transfer (REST)-style network-based services architecture, a document- or message-based network-based services architecture, or another suitable network-based services architecture.

In some embodiments, a client 210 may provide access to network-based services to other applications in a manner that is transparent to those applications. For example, client 210 may integrate with an operating system or file system to provide storage in accordance with a suitable variant of the storage models described herein. However, the operating system or file system may present a different storage interface to applications, such as a conventional file system hierarchy of files, directories and/or folders. In such an embodiment, applications may not need to be modified to make use of the storage system service model. Instead, the details of interfacing to provider network 200 may be coordinated by client 210 and the operating system or file system on behalf of applications executing within the operating system environment.

Clients 210 may convey network-based services requests (e.g., access requests directed to graph data structures in directory storage service 220) to and receive responses from network-based services platform 200 via network 260. In various embodiments, network 260 may encompass any suitable combination of networking hardware and protocols necessary to establish network-based-based communications between clients 210 and platform 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 210 and network-based services platform 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 210 and the Internet as well as between the Internet and network-based services platform 200. It is noted that in some embodiments, clients 210 may communicate with network-based services platform 200 using a private network rather than the public Internet.

Various different data storage service(s) 220 may be implemented as part of a provider network. For example, a data storage service may host different data sets that are different relational databases (or tables thereof) and may be a database service. Similarly, non-relational database services, object-based storage services, graph-based storage services, or other data storage services may host data sets on behalf of users of the data storage services and thus may implement the techniques discussed above and below with respect to providing a consistent view of associations between independently replicated data objects amongst different data sets. One example of such a storage service is a directory storage service.

Figure 3:
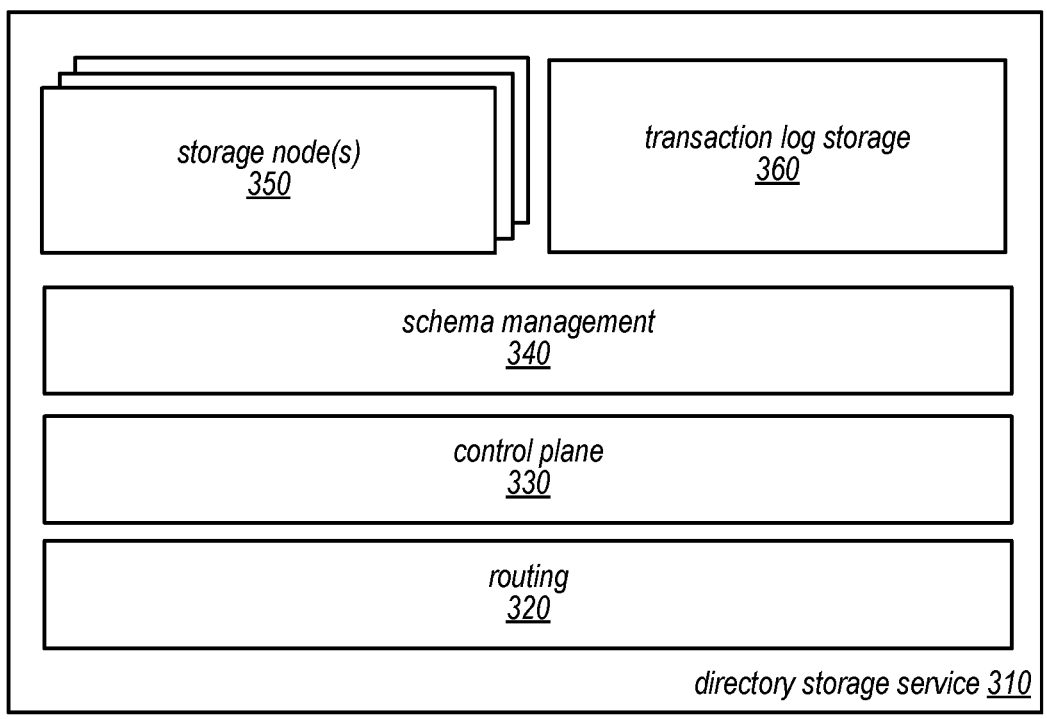
FIG. 3 is a logical block diagram illustrating an example storage service, a directory storage service, according to some embodiments.

FIG. 3 is a logical block diagram illustrating an example storage service, a directory storage service, according to some embodiments. Directory storage service 300 may store, manage, and maintain graph data structures, such as a directory structure which may provide one or multiple hierarchies of data objects discussed below with regard to FIG. 4, stored at various ones of storage node(s) 350 (in single tenant or multi-tenant fashion). Directory storage service 310 may, in some embodiments, implement a graph database or data store for creating, accessing, and otherwise managing graph data structures. For example, directory storage service 310 may utilize graph database traversal techniques for searching or updating graph data structures stored on behalf of clients of directory storage service 310. Clients of directory storage service 310 may operate on any subset or portion of the graph data structure with transactional semantics and/or may perform path-based traversals of graph data structures. Such features allow clients to access graph data structures in many ways. For instance, clients may utilize transactional access requests to perform multiple operations concurrently, affecting different portions (e.g., nodes) of the directory structure (e.g., reading parts of the directory structure, adding an object, and indexing some of the object's attributes, while imposing the requirement that the resulting updates of the operations within the transaction are isolated, consistent, atomic and durably stored) or may specify requests in a graph query language which may perform one or multiple traversals as part of a single request (e.g., as part of a single query).

In various embodiments, directory storage service 310 may implement routing layer 320 to direct access requests from internal or external clients to the appropriate storage node(s) 240. For example, routing layer 320 may implement a fleet of routing nodes that maintain mapping information which identifies the locations of a graph data structures on storage node(s) 350. When an access request is received, routing layer nodes may then determine which one of the storage node(s) 350 that hosts the graph data structure identified in the access request to send the access request. Consider a scenario where graph data structures may be replicated across multiple different storage nodes 350 as part of a replica group. Routing 320 may implement various load balancing schemes to direct requests from different clients to different storage nodes within the replica group, so that no single storage node becomes overburdened. Moreover, as storage nodes 350 may utilize tokens to maintain state across different access requests sent by clients so that different storage node(s) 350 may handle each request from the client, routing 320 need not track which storage node is communicating with which client.

Control plane 330 may implement various control functions to manage the storage node(s) 350 and other components of directory storage service 310 that provide storage of graph data structures, such as directing creation and placement of new graph data structures on storage node(s) 350, storage scaling, heat management, node repair and/or replacement. For example, various placement schemes may utilize techniques such as consistent hashing (e.g., based on hashing an identifier for individual hierarchical data structures) to identify storage node(s) to store versions of the graph data structure, or randomly mapping graph data structures to a number hierarchy storage node(s) 350 that form a replica set. To provide heat management, for example, control plane 330 may collect storage node(s) 350 metrics published by each node. Each host may have various thresholds for performance characteristics, such as memory utilization, CPU utilization, disk utilization, and request-rate capacity. When a storage node 350 reports metrics that exceed a threshold (or multiple thresholds), control plane 330 may direct the migration of one or more graph data structures to different storage nodes. Similarly, control plane 330 may detect when certain storage nodes are unable to keep up with access requests directed to a particular replica group for a graph data structure and may provision additional storage node(s) 350 to horizontally scale the replica group to better meet the access request demand.

Storage node(s) 350 may maintain and handle requests to graph data structures stored by storage nodes 350 in directory storage service 310. In some embodiments, storage nodes 350 may implement request handler to process access requests, such as those request discussed below with regard to FIGS. 6, 8 and 9, and pass along appropriate instructions or requests to other components, such as storage engine or transaction log interface. For example, the access request handler may interpret various requests formatted according to a programmatic interface, such as an application programming interface (API). Access requests may include various, such as various access requests to create, update, attach, detach, delete and query objects in a graph data structure, or and access requests to define, populate, discover, and query a local index object as discussed below.

Figure 4:
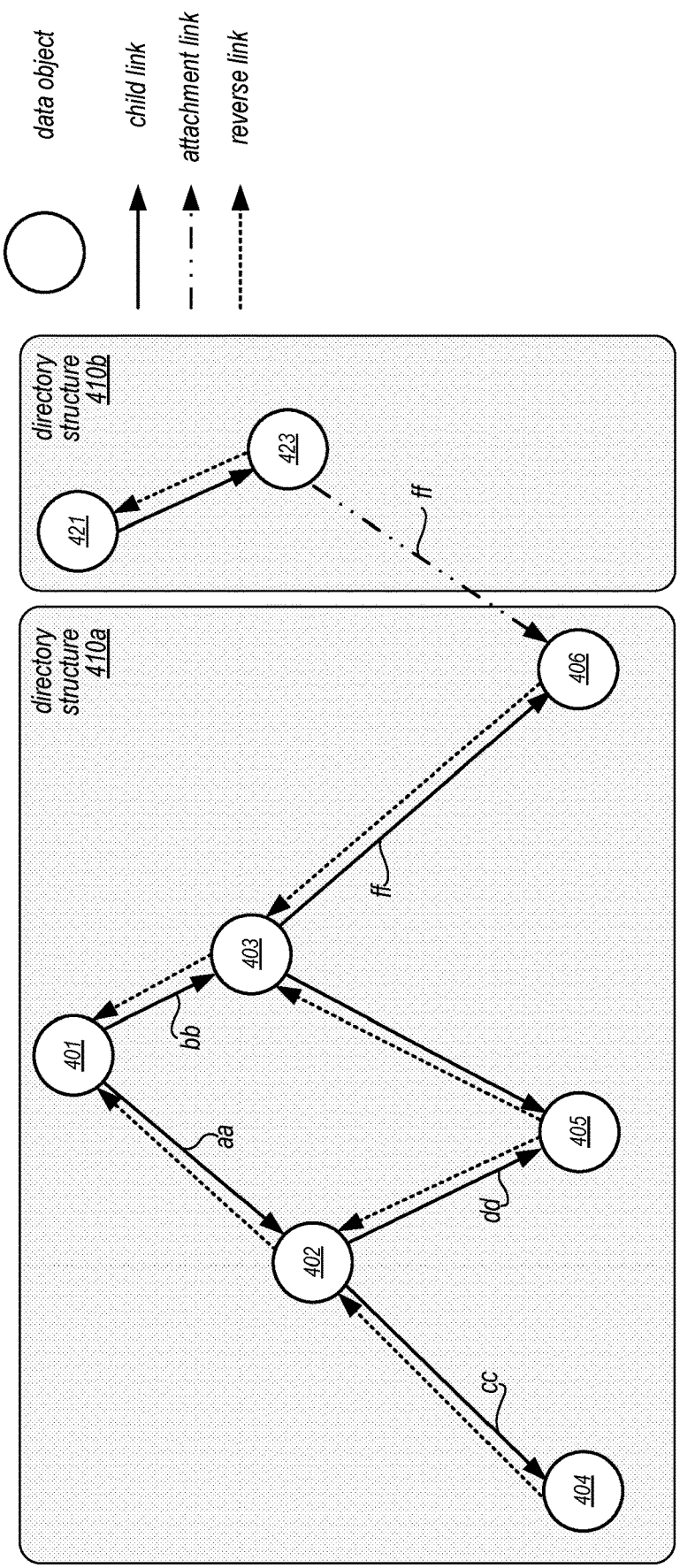
FIG. 4 is a logical block diagram illustrating a data model for a graph data structure, a directory structure, according to some embodiments.

In various embodiments, the storage engine of a storage node may be a storage engine that interacts with structure or format of data as it is stored in a graph data structure store (e.g., a key-value storage engine for data maintained in key-value storage format, relational data storage engine for data maintained in a relational storage format, etc.) accessible to the storage node and schema store accessible to the storage node which may maintain a schema that is applied to the graph data structure maintained in the graph data structure store (which may be maintained according to the models discussed below with regard to FIG. 4). In some embodiments, the graph data structure store may be partially or completely implemented in memory or other quick access storage devices, such as random access memory devices (RAM), as well as utilizing persistent block-based storage devices to store graph data structures, including magnetic disk or solid state drives. In some embodiments, caching techniques may be implemented so that frequently accessed portions of data, such as frequently access portions of graph data structures are maintained in memory components whereas other portions are maintained in block-based persistent storage components. Storage nodes 350 may operate multi-tenant storage for graph data structures so that different graph data structures maintained on behalf of different clients, accounts, customers, and the like may be maintained in the graph data structure store and schemas applied to the graph data structures in the storage node's schema store. For example, a storage node 350 may participate in different replica groups with different storage nodes for the different graph data structures stored at the storage node 350.

Storage nodes 350 may implement a transaction log interface that may provide capabilities to interact with (e.g., validate transactions) with respect to the logs corresponding to graph data structures stored in transaction log storage 360 for the graph data structures, according to the various techniques. Transaction log storage 360 may provide consistent storage for versioned graph data structures, according to some embodiments. Multiple clients may perform various access requests to a graph data structure concurrently, such as various write requests. In a least some embodiments, a replica group may include multiple storage nodes that maintain versions of the graph data structure that are available for servicing various access requests from the multiple clients. For example, clients can submit different write requests to storage nodes according to a routing layer (e.g., routing layer 320) which may direct access requests from each client to a different storage node in the replica group according to a load balancing scheme. Upon receiving the request, each storage node may perform various operations upon a version of the graph data structure at the storage node, then offer the writes to transaction log storage 360 for commitment to graph data structure log stored in transaction log storage (including various information such as the affected or accessed data by performing the write request, the write request itself, and a transaction sequence number of other indication identifying the point-in-time of the current version of the graph data structure at the storage node). Indications of commitment or conflict may be provided back from transaction log storage 360 to the respective storage nodes 350. For those writes that are committed, the graph data structure log may be read and committed writes applied to the respective versions of the graph data structure maintained at the multiple storage nodes 350.

Transaction log storage 360 may provide a fault tolerant, high performance, durable, log publishing service. Transaction log storage 360 may be used as a commit log underlying strongly consistent distributed applications such as databases, key-value stores, and lock managers, and as illustrated in FIG. 2 directory storage service 310 providing graph data storage, as discussed above. Transaction log storage 360 may provide strong consistency guarantees and support constraints between committed records, to enable features like deduplication, sequencing, and read-write conflict detection. For example, in various requests transaction log storage 360 may determine whether or not to commit changes to graph data structures (e.g., write requests and other modifications) by examining a proposed transaction for conflicts with other committed transactions. Such a feature may provide a fine-grained locking model over the graph data structure (e.g., only those portions of the graph data structure affected by a conflict between transactions may be locked). Transaction log storage 360 may maintain a separate log or chain of log records for each graph data structure, serving as an authoritative definition of the changes to the state graph data structure over time. Transactions may be ordered according to transaction sequence numbers, which may be monotonically increasing to reference the state of a graph data structure at individual points in time. Note that in some embodiments, transaction log storage 360 may be a separate network-based storage service implemented as part of provider network 360 external to directory storage service 360.

Different types of graph data structures may be different respective data sets that are stored, managed, and or represented in different ways, including independent replication as discussed below with regard to FIG. 7. FIG. 4 is a logical block diagram illustrating a data model for a graph data structure, a directory structure, according to some embodiments. An object may be the basic element of a directory structure, such as directory structures 410a or 410b and may be represented with circles in the graph depicted of FIG. 4 (e.g., objects 401, 402, 403, 404, 405, 406, 407, 421 and 423). An object may have a globally unique identifier (GUID), zero or more attributes (key, value pairs), and zero or more links to other objects. In some embodiments, a directory may be one type of object which has zero or more child links to other objects, either directories or resources. In FIG. 4, objects 401 and 421 are examples of a directory objects. Some objects may be resource or other data objects (such objects 402, 403, 404, 405, 406, and 407) in a directory structure 410. A resource object may have a unique external Id (e.g., client specified) and client-defined attributes. Data objects can have more than one parent object, in some embodiments, (which would allow for some graph data structures to be configured as a Directed Acyclic Graph (DAG). Object 405 in FIG. 4 is an example of a resource object and it has two parents (objects 402 and 403).

In some embodiments, multiple types of data objects may be implemented. For example, in some embodiments, policy objects may be a type of data object with two user-defined attributes: a policy type and policy document (e.g., describing a policy applied to applicable objects). For example, object 406 in FIG. 4 may be an example of a policy object. In some embodiments, a data object may represent a person, item, or resource which may be attached to a policy object (e.g., as object 423 is attached to object 406 (which may be a policy object).

In some embodiments, a link may be a directed edge between two objects defining a relationship between the two objects. There may be many types of links, such as client visible link types and another link type for internal operation implementation. In some embodiments, a child link type may create a parent-child relationship between the objects it connects. For example, child link 'bb' connects object 401 and object 403. Child links may define the hierarchies of directory structures 410, in some embodiments. Child links may be named in order to define the path of the object that the link points to, in some embodiments. Another type of client visible link may be an attachment link. An attachment link may apply an object, such as a policy object, to another object, such as a directory object. Attachment links may not define the hierarchy of directory structures 410, in some embodiments. For example, attachment link 'xx' applies the policy attribute stored in policy object 406 to object 423. Objects can have multiple attachments. In some embodiments, some attachment restrictions may be enforced, such as a restriction that not more than one policy object of any given policy type can be attached to a same object. A non-client visible type of link or implied link type may also be implemented in some embodiments, a reverse link. Reverse links may be used for optimizing traversal of directory structures 410 for common operations like object look-ups (e.g., policy lookups). Therefore, providing consistent views of objects that are independently replicated from different data structures may be implemented to ensure that a lookup operation does not encounter an attachment link without the ability to retrieve a copy of the attached object (e.g., the attached policy 406), in some embodiments. Directory storage service 310 may maintain reverse links in the opposite direction of child and attachment links.

To store the illustrated directory structures in an underlying data store, the described objects, links attributes, and the like may be modeled after a Resource Description Framework (RDF) data, in some embodiments. To maintain multiple versions of the hierarchical data structures, versioning information may also be included to express how the data has changed over time. RDF data may be structured as (Subject, Predicate, Object) tuples. When including additional versioning information this structure may become: (Subject, Predicate, Object, Version, PreviousVersion). To represent the hierarchical data structures based on RDF, there may be multiple types of RDF predicates. In some embodiments, one type of RDF predicates may represent links of the hierarchical data structure and another type of RDF predicates may represent attributes of the hierarchical data structure. Different types of predicts may represent the hierarchical data structure differently. Link predicates may be between two objects, whereas attribute predicates may be between an object and a value. Since a single object might participate in several predicates of the same type, but with different values, predicates may begin with a common prefix and end in some additional type or naming information to aid in lookups. For example, the version entry in a tuple of a predicate may be the logical timestamp (e.g., transaction sequence number) at which the link or attribute was created, as all changes to a hierarchical data structure may utilize the transaction resolution process provided by transaction log storage 360 and may be assigned an ordered logical timestamp by transaction log storage 360.

Storage nodes may maintain a current version of a directory structure 410 and past versions of a hierarchical data structure. In at least some embodiments, different respective tables may be maintained for each directory structure, one table that stores the data for the current version and another table that stores immutable records for the previous versions. In various embodiments a current version table or previous versions table may be accessed to perform various operations for a directory structure. For example an access request may specify a query: "Find all children for Object whose ID is GUID_401 select GUID_401.child.* from CurrentVersion" or a query: "Find all policies for a resource object whose ID is GUID 405 along all paths to the root. To service such queries, a depth first traversal may be executed along the parent links. At each object along the path to the root, the following internal queries may be executed: internal query 1: "Find if the object has policies: select GUID 405.link.HasPolicy.* from CurrentVersion;" internal query 2: "If the object has policies returned in internal query 1, use the value from the link to get the policy document value from the policy object: select GUID 406.link.PolicyDoc from CurrentVersion;" internal query 3: "Find all parents for current object and perform internal queries 1-3 for each parent object until reaching the root of the directory structure. Please note that previous examples are not intended to be limiting as to the format, structure, syntax, or other ways in which queries may be expressed or processed with respect to graph data structures.

In at least some embodiments, a schema may be applied to a graph data structure, such as a directory illustrated in FIG. 4. A schema may include one or multiple schema classes, which may be organized according to inheritance (e.g., parent and child) links and named links. A schema class may represent a set of attributes that can be attached to an object, in some embodiments. Each individual object may have any number of classes associated with it, and each class applied to the object may maintain its own independent set of attributes.

A schema may be treated as a set of metadata which can be referred to from a variety of different locations (e.g., from different directory structures). For example, if a directory structure references a schema, that directory structure has "applied" the referenced schema. In at least some embodiments, all data within a directory structure that applies a schema may have to conform to that schema. A schema can be applied to multiple directories, serving as a blue-print for constructing and maintaining the different directories. Once a schema is applied to a directory structure, it may be extended or modified from the originally referenced form of the schema, as discussed below in some embodiments. A schema may itself be modified so that each directory that applies the schema can apply the modified version of the schema (if desired), in some embodiments. Schema contents (e.g., classes, links, etc.) may be consumed by programmatically by clients accessing the directory (e.g., via API calls). By exploring the schema, clients can discover the full set of classes, including attributes and constraints of the classes, which apply to data within the directory.

Inheritance links may define a parent or child schema class for a schema class. In some embodiments, a schema class may reference one or more parent schema classes. Attributes may not be inherited from parent schema classes, in some embodiments. However, when an object is created or associated with a schema class, the object may become an instance of ancestor schema classes as well, in some embodiments. For example, if a "Manager" class has an "Employee" class as a parent, and an "Employee" class has a "Person" class as a parent, assigning a new object to the "Manager" class may automatically assign the "Employee" and "Person" to the object. This may allow for the effect of inheriting the attributes of the classes, but without those attributes crossing into the derived class's attribute set, in some embodiments. Attribute sets for each class may be permanently distinct. Inheritance links may be defined at schema class creation time, and may be immutable, in some embodiments. In this way, concrete assumptions about the presence and absence of attributes for an object can be made, which facilitates modeling object hierarchies, in various embodiments. Immutable class inheritance may also avoid scenarios where a parent class's attributes are either absent (in the case of a parent class added after the object was created) or stranded (in the case of a parent class removed after the object was created). In other embodiments, however, a schema classes may inherit attributes directly from parent schema classes.

A class may be described by a set of class data, such that each object that is an instance of the class may include that data. For example, class data may include a name, description (e.g., for developers, administrators, or consumers), constraints (e.g., an object that is an instance of this class 'must be child of an object that is an instance of class X', 'child objects must be instances of class Y'), permission(s) (access controls for the object), attribute(s), named link(s), inheritance (e.g., parent or child classes), and/or a tag, in some embodiments. One or multiple attributes may be included in a class, and may include various data such as attribute data. In this way, a class can describe what data is stored as part of an object and how that data may be interacted with by a client. For example, permissions assigned to a schema class (or attribute or schema) may be considered when requests are made against a schema (to read or apply it), or against an applied schema (to read or write directory data). Permissions may be defined on the schema class, but influence all read operations related to objects that are instances of that class. Consider a scenario where a client attempts to read a set of attribute fields on an object. The object may be an instance of a schema class and the schema class's permissions may be included in the authorization of that request. In this way, a schema class's permissions may state a specific set of clients (users or other entity associated with an identity) is allowed to read a specific list of attributes on any instances of that schema class. Similar permissions could be enforced with respect to other operations for objects that are instances of that schema class, including creation and deletion operations. Note that, in some embodiments, permissions may only apply to the set of attributes for a specific schema class, and not for the directory object itself, which is an instance of the schema class. For instance, a client could be able to read and modify one set of attributes of an object that is an instance of one schema class, and be unable to read another set of attributes on the same object according to different permissions for the other set of attributes of a different schema class (which the object is also an instance of).

Attribute data may include an attribute name, description, type (e.g., string, int, code, code pointer, etc.), execution data, permissions (e.g., who can read/write the attribute data value), and default value (e.g., which may be provided if not overwritten for a particular instance of the class). Different attribute data types may include, but are not limited to, String, Integer, Boolean, Decimal, and Date, to facilitate sorting or selecting objects based on inequality comparators (e.g., querying for a bounded or unbounded interval in a range). In some embodiments, attributes may be defined as "shared". Shared attributes may participate in a directory-global namespace which may be managed by schema management 236 in FIG. 2. When two schema classes define shared attributes with the same name, the values of those shared attributes may be shared across the schema classes. For example, if a "User" schema class is defined with a shared "surname" attribute, and an "Employee" schema class attribute is also defined with a shared "surname" attribute, an update of one attribute will also update the other. In some embodiments, only one value of a shared attributed may be stored. In order to update a shared attribute, a new value may have to be validated for all attribute definitions of the different class schemas that share the attribute and apply to the object, in some embodiments. Attribute constraints may be automatically validated or validated/interacted with as part of execution data of client-specified code, in some embodiments. Constraints may include min/max values, min/max lengths (e.g., for strings), acceptable character sets, or regular expression-based validation. In some embodiments, an attribute may be code that is triggered for execution when an object that is an instance of the class that includes the attribute is accessed (e.g., for create, read, update, or delete).

A schema may be stored in various ways. In some embodiments, a schema may be stored as a document (e.g., a JSON document) in a standard, hierarchical structure or in another language independent data format. The document may contain all shape-related information for the schema, including attribute type, validation rules, indices, and other auxiliary information. Indices, and information which loses context when moved between accounts (e.g., permissions, references to external resources like external code execution platforms, etc.), may be represented separately in a manner which makes them easily distinguishable from the core schema shape information (e.g., in a separate JSON document). Permissions for a schema may be stored outside of the document, in some embodiments. For example, schema classes may be represented as children of a "schema class" node attached to the root node, forming the structural schema class hierarchy. Permissions may then be associated with each of the schema classes, in some embodiments, which can then be evaluated similar to perform a directory structure lookup operation as discussed above. Additional, clients can register for directory update event notifications without requiring mutation of the schema definition, in some embodiments.

Figure 5:
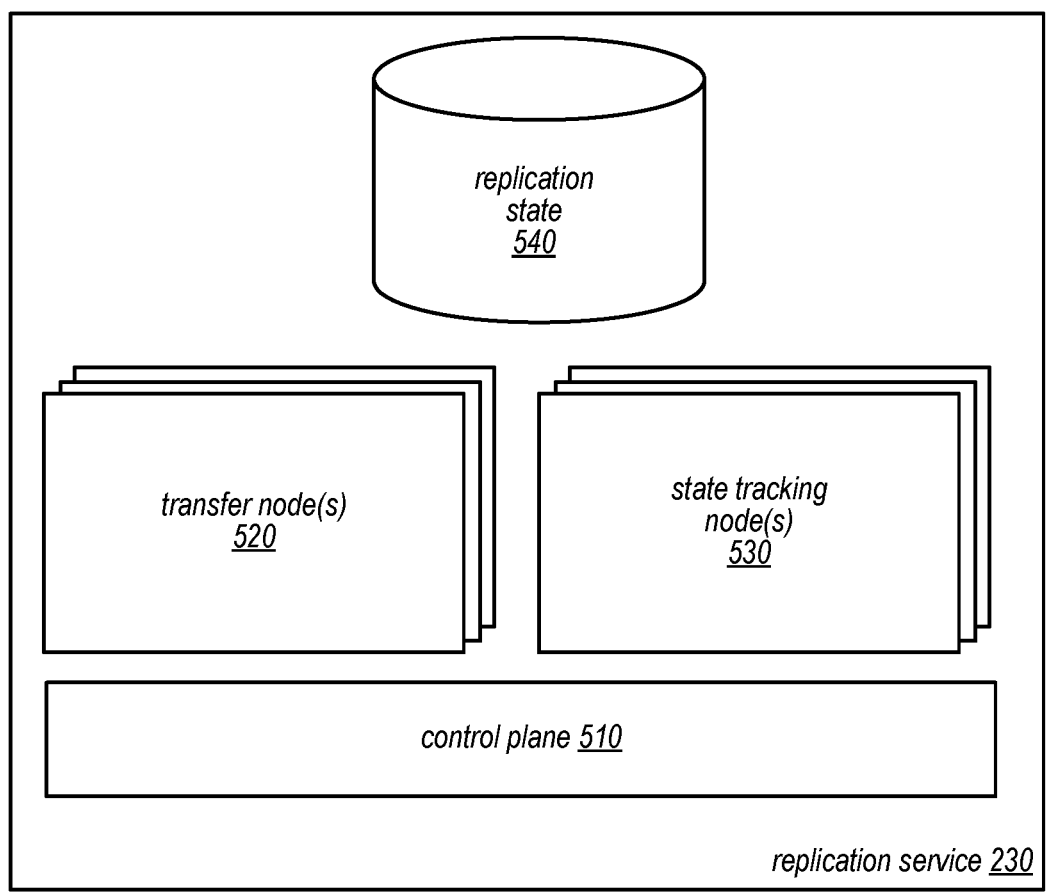
FIG. 5 is a logical block diagram illustrating an example replication service, according to some embodiments.

Data sets hosted by data storage services 220 may be replicated to various copies hosted in different locations within data storage services 220 or at another instantiation of a data storage service hosted in a separate provider network region accessible via a Wide Area Network, in some embodiments. As discussed above with regard to FIG. 1, the data from different data sets may be replicated independently (even data sets hosted in a same service), in some embodiments. For example, one relational database hosted in a relational database service may be replicated separate from another relational database hosted in the same relational database service. FIG. 5 is a logical block diagram illustrating an example replication service, according to some embodiments.

Replication service 230 may implement control plane 510 implement various control functions to manage the transfer node(s) 520, state tracking node(s) 530, and other components of replication service 230, such as assigning transfer node(s) 520 and state tracking node(s) 530 to data sets for outgoing or incoming changes, node scaling, heat management, node repair and/or replacement.

Transfer node(s) 520 may send from and/or receive updates to an assigned data set, in some embodiments. For example, transfer node(s) 520 may subscribe as a replica or client of an updates stream generated for a data set (e.g., a MySQL binlog stream) in order to obtain the updates that are performed at a data set. For outbound updates, a transfer node 520 may encrypt, compress, or perform various other operations to reformat updates. The transfer node 520 may then send the reformatted updates to another transfer node 520 that performs inbound update processing for a copy of a data set (e.g., hosted in a data store that is implemented in another storage system or service, location within the same storage system or service, or at a different region of a provider network, which the updates may travel over a public network to reach the different region). Transfer node(s) 520 that process the inbound updates may undo or remove the formatting performed at outbound processing and reply the updates to apply the updates to the copy of the data set. FIG. 7 provides further discussion of these features below.

State tracking node(s) 530 may monitor the performance of replication and update replication state 540 with the progress of updates performed with respect to a source and copy of a data set, in some embodiments. For example, updates may be tracked according to version, sequence, or other numbers or indicators that provide a logical ordering for updates to a respective data set. In some embodiments, the tracking state may be evaluated to determine whether or not referenced objects are present in a copy (e.g., if the replication state for a copy is at version 10,500 and the reference object creation occurs at 10,600, then the replication state for the copy indicates that the referenced object is not yet added to the copy). Replication state 540 may be stored in a separate storage service or centralized store that stores data set information, including version information. In some embodiments, the state of individual objects may be tracked (instead of or in addition to data sets (e.g., tables, directory structures, etc.)) as well as the state of individual copies (and not others). Individual objects may be tracked, in some embodiments, by including the tracked object in the state of a data set or copy when the object has been successfully stored to the copy. State tracking node(s) 530 may, in some embodiments, initiate, participate, or obtain the results of a consensus algorithm for updates made to a copy of a data set, in some embodiments, in those scenarios where a distributed set of resources hosts the data set and consensus may have to be achieved before an update is considered performed to the data set copy (e.g., state tracking node(s) may identify a quorum of nodes within a data set, receive an acknowledgement from each node, observe a voting or other synchronization technique, among others. In some embodiments, multiple copies of a data set may be tracked, each of which may be independently replicated such that replication state may be tracked across all copies, before including both a referenced object and reference or performing garbage collection of a referenced object. In some embodiments, state tracking node(s) 530 may perform garbage collection techniques to remove referenced objects from duplicate data sets once replication state 540 indicates that the referenced object is included in the appropriate data set copies, as discussed below with regard to FIG. 10. In some embodiments, tracking node(s) 530 may send indications or other notifications to client applications or other registered "listeners" for individual data objects or copies of data stores (or portions thereof) when the tracking node(s) 530 determine that one or more of the copies of data stores include various objects or updates (e.g., from which the client application or listener has requested or otherwise specified updates to be received) as a result of replication from source data stores to copies of the data stores.

Data stores implemented in one region may be replicated to copies of the data stores in another region. FIG. 6 is a logical block diagram illustrating interactions to attach a referenced object, according to some embodiments. Region 602 may include storage node(s) 610 which may implement a data store. A request 650 may be received to attach a referenced object from another data store. As indicated at 652 replication state 612 may be retrieved for the copy of the referenced object's data store. As discussed above and below, if the referenced object is not included in the copy of the referenced object's data store, then both the reference and the referenced object may be stored at storage node(s) 610 implementing the data store. Storage node(s) 610 may provide a reference and referenced object 654 as part of replicating the data store at storage node(s) 610 to a copy of the data store in region 604 at storage node(s) 640. Outbound transfer node 620 may perform operations to reformat, encrypt, compress and/or replicate the reference and target object 656 to inbound transfer node 630. Inbound transfer node 630 may then store 658 the reference and target object 658 in storage node(s) 640.

Figure 7:
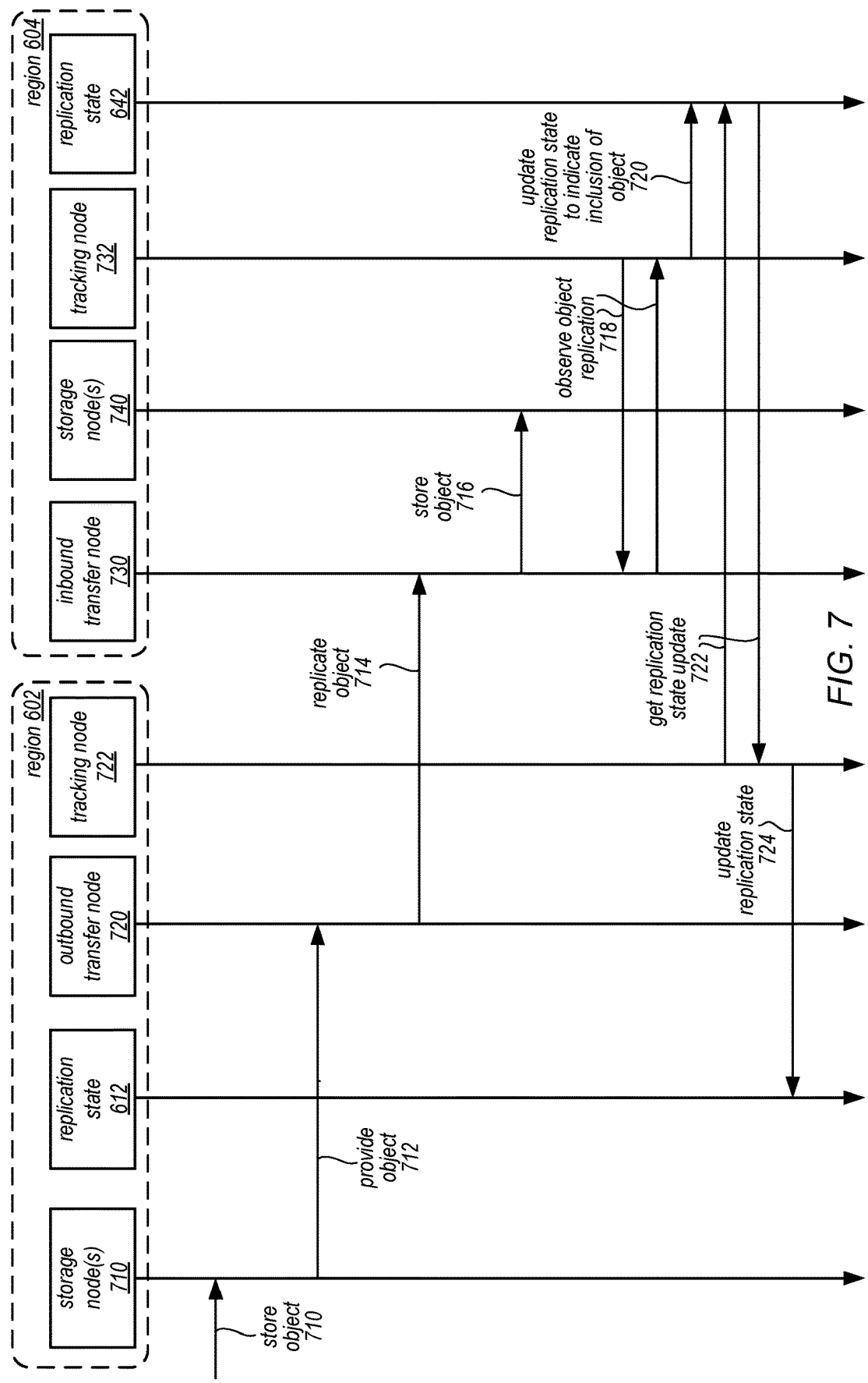
FIG. 7 is a logical block diagram illustrating interactions to store an object, according to some embodiments.

FIG. 7 is a logical block diagram illustrating interactions to store an object, according to some embodiments. As indicated at 710, a request store an object 710 may be received at storage node(s) 710 that implement a data store in region 602. The object may be provided 712 to outbound transfer node 720, which may replicate 714 the object to inbound transfer node 730 in region 604. Inbound transfer node 730 may store the object 716 in storage node(s) 740. Tracking node 732 may observe the object replication 718 and update 720 replication state for region 604 to indicate the inclusion of the object in the copy of the data store in region 604. Tracking node 722 in region 602 may get the replication state update 762 and then update 724 the replication state 612 of region 602 to reflect the inclusion of the object in the copy in region 604. Note that the examples of replication state requests and other interactions depicted in FIGS. 6 and 7 could be implemented using alternative communication paradigms (e.g., a push model for pushing out replication state or other information as opposed to a pull model for requesting replication state) and thus the previous examples are not intended to be limiting.

The data storage services, including the directory storage service and replication service, discussed in FIGS. 2 through 7 provide examples of providing a consistent view of associations between independently replicated data objects in different scenarios. However, various other types of data storage systems that perform independent replication of different data stores may implement providing a consistent view of associations between independently replicated data objects, which may utilize other numbers of types or components. FIG. 8 is a high-level flowchart illustrating methods and techniques implement providing a consistent view of associations between independently replicated data objects, according to some embodiments. Various different data stores including the embodiments described above may implement the techniques described below.

As indicated at 810, updates to a first data store may be replicated to a copy of the first data store independent of updates to a second data store that are replicated to a copy of the second data store, in some embodiments. For example, a replication service may be implemented to manage and perform the transfer of updates separately for each data store, in some embodiments. As discussed above with regard to FIG. 1, different replication techniques could be implemented for the different data stores, in some embodiments. For example, the first data store may be one type of data store (e.g., a directory structure store similar to FIG. 3 above) whereas the second data store may be a second type of data store (e.g., an object or key-value store). The replication techniques that are optimal or compatible with the different types of data stores may be performed (which may be different) in such a scenario. Moreover, as different replication techniques may offer different performance characteristics the likelihood of an inconsistent view of associated objects could be increased if the replication techniques are different, in some embodiments.

As indicated at 820, a request may be received to store a reference that associates a first object stored in the first data store with a second object stored in the second data store, in some embodiments. In some scenarios, as illustrated in FIG. 1 above, the request to store the second object may precede the request to store the reference, but the independent replication techniques could potentially replicate the reference before the second object. The request may be a request to include or add a pointer, address, foreign key, or any other value or indicator for the referenced object (which may depend upon the type of object and/or the type of second data store). For instance, in some embodiments, an object identifier may be a key or other indicator value or, in the case of an object in a graph structure a path or other information used to locate the referenced object.

As indicated at 830, a determination may be made as to whether a copy of the second data store include(s) the second object, in some embodiments. For example, version numbers of the copy may be compared with a version number associated with the second object (e.g., associated with a request to create/store the second object in the second data store) which may indicate whether the current version of the copy includes the second object. In some embodiments, replication state for the copy may indicate that the second object is included if it stores a copy of the second object, in some embodiments. If the copy of the second data store does not include the second object, then the second object may be stored with the reference in the first data store to be replicated together to the copy of the first data store, as indicated at 840, in some embodiments. For example, the reference and the second object may be stored as part of a single transaction to update the first data store so that either both operations are successfully performed, or not, and either both operations are successfully replicated or not, in some embodiments. As indicated at 850, if the copy of the second data store does include the second object, then the reference alone may be stored in the first data store to be replicated without the second object, in some embodiments.

Figure 9:
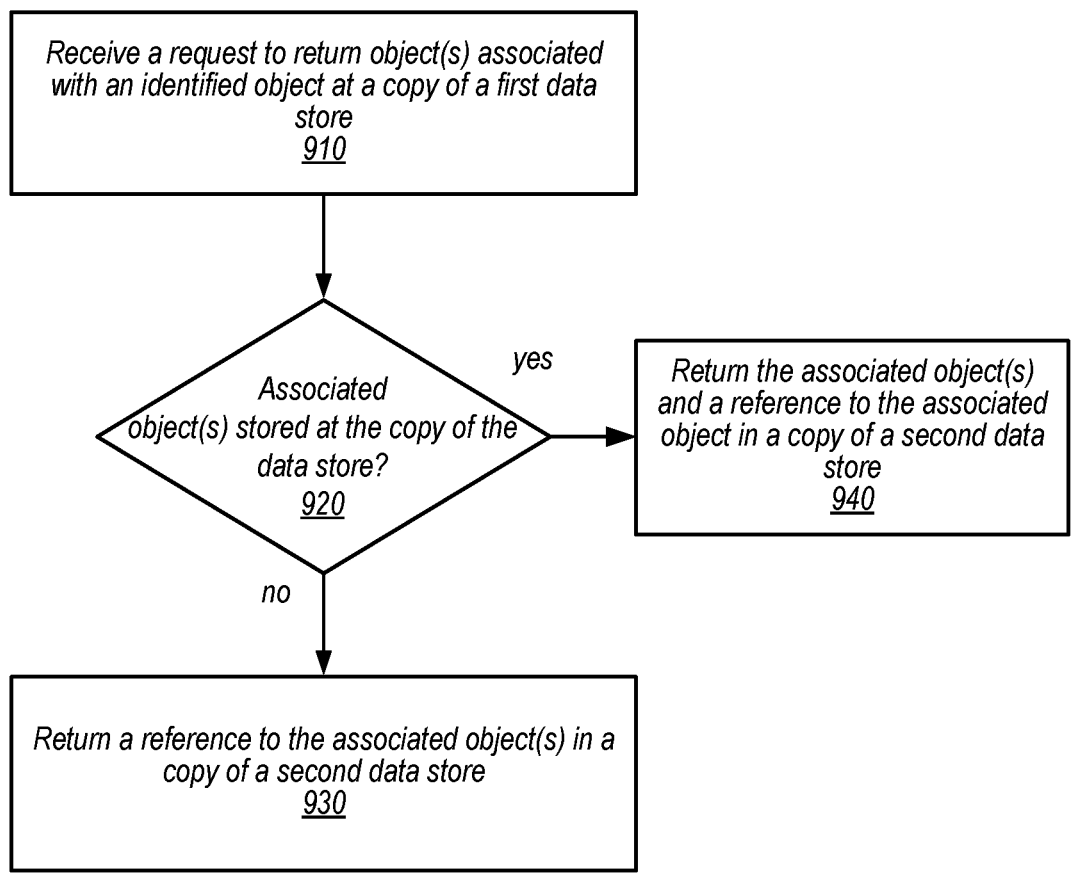
FIG. 9 is a high-level flowchart illustrating methods and techniques to implement reading a consistent view of associations between independently replicated data objects, according to some embodiments.

As discussed above with regard to FIG. 1, providing a consistent view of associated data objects that are independently replicated may rely upon the inclusion of a referenced data object in the copy of the data store that also stores the reference. The data store may then be able to provide the consistent view whether the referenced object has also been replicated to its respective data store copy or not, in some embodiments. FIG. 9 is a high-level flowchart illustrating methods and techniques to implement reading a consistent view of associations between independently replicated data objects, according to some embodiments.

As indicated at 910, a request to return object(s) associated with an identified object may be received at a copy of a first data store, in various embodiments. For example, the request may be a lookup request to return attached objects to a specified object across multiple graph structures (e.g., like the directory structures illustrated in FIG. 4). In some embodiments, request may be a database query that includes a join predicate using a foreign key value that references a record in a different table.

Once received, a determination may be made as to whether the associated object(s) are stored at the copy of the data store, as indicated at 920, in some embodiments. For example, a separate table or structure at the copy of the data store for referenced objects may be scanned or searched for an object identified by a reference in the identified object, in some embodiments. As indicated by the positive exit from 920, if the associated object(s) are stored at the copy of the data store, then the associated object(s) and a reference to the associated object in a copy of a second data store may be returned, in response to the request, as indicated at 940, in some embodiments. For example, a link, pointer, address, or other information for obtaining the object from the copy of the second data store may be returned along with a copy of the associated object. By returning the referenced object in addition to the reference, a client may be saved a second request to the second data store (which would not be successful), saving the client time in performing the query and increasing the performance of the client (in addition to providing a consistent view of the associated objects), in some embodiments. As indicated at 930, if associated object(s) are not stored at the copy of the data store, then a reference to the associated object(s) in a copy of the second data store may be returned, in various embodiments.

Figure 10:
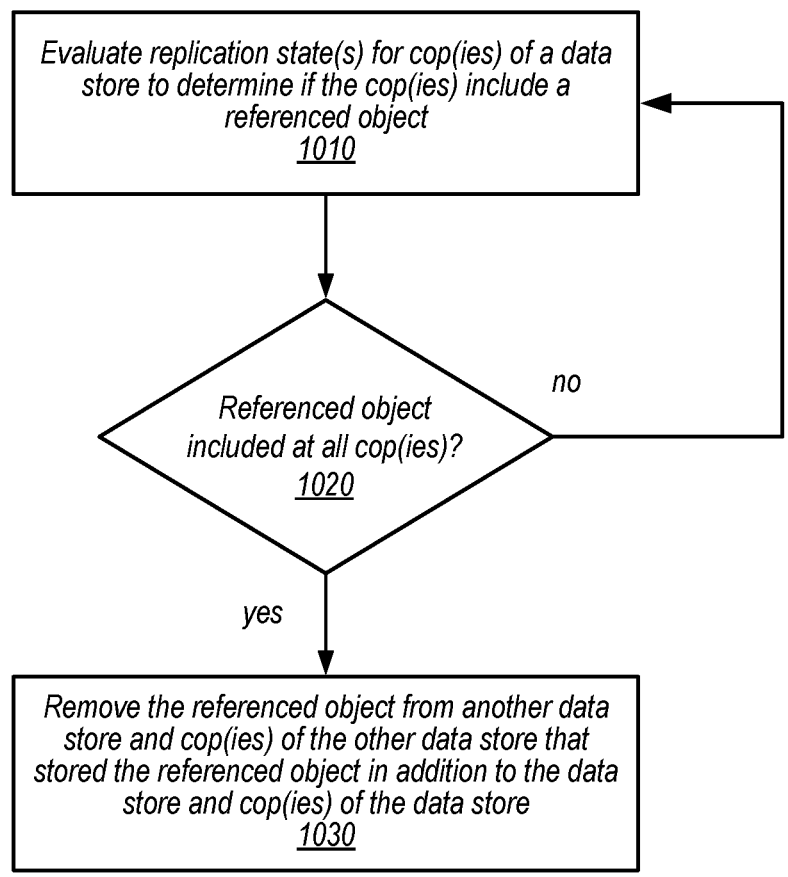
FIG. 10 is a high-level flowchart illustrating methods and techniques to remove additional copies of a referenced object stored to provide a consistent view of associations between independently replicated data objects, according to some embodiments.

The additional reference objects stored along with a reference to the objects may increase over time as a consistent view is provided, in some embodiments. A tracking node of a replication service, as discussed above with regard to FIG. 3, for instance, may perform requests to a data store to remove the referenced object from the data stores which also store the reference (e.g., deletion requests). FIG. 10 is a high-level flowchart illustrating methods and techniques to remove additional copies of a referenced object stored to provide a consistent view of associations between independently replicated data objects, according to some embodiments. As indicated at 1010, replication state(s) for cop(ies) of a data store may be evaluated to determine if the cop(ies) include a referenced object, in some embodiments. For example, a timer or other event trigger (e.g., based on storage utilization or remaining capacity) may initiate the evaluation for one (or multiple) referenced objects that have been stored in addition references. The evaluation may be performed in different ways. For example, in one embodiment, the version number or indicator of the cop(ies) of the data store may be evaluated with respect to a version number that is associated with storing the copy in the source data store (e.g., the data store that stored the referenced object before it was referenced). If the version number meets or exceeds the version number associated with storing the copy, then the copy may be considered to include the referenced object. In some embodiments, the presence of the referenced object in replication state for a copy may be indicative that it is included in the copy. A combined data structure (e.g., tracking table) may be generated in some embodiments by taking a union of rows from individual tracking tables for different copies As indicated at 1020, if the reference object is included at all cop(ies), then it may be removed from another data store (e.g., the data store that stores the reference and other object) and the cop(ies) of that other data store that stored the referenced object in addition to the data store and cop(ies), in some embodiments. For example, the referenced object may be marked for deletion, deleted, or otherwise made unavailable for access. In some embodiments, a copy of the data store may no longer provide that referenced object in response to a lookup request, as discussed above with regard to FIG. 9. If, as indicated by the negative exit from 1020, the referenced object is included in all cop(ies) of the data store, then the evaluation at 1010 may be performed again until it does (e.g., in response to the detection of another trigger event), in some embodiments. In other embodiments, not illustrated, referenced objects can be removed individually from copies as the copies are determined to have included the referenced object.

The methods described herein may in various embodiments be implemented by any combination of hardware and software. For example, in one embodiment, the methods may be implemented by a computer system (e.g., a computer system as in FIG. 11) that includes one or more processors executing program instructions stored on a computer-readable storage medium coupled to the processors. The program instructions may implement the functionality described herein (e.g., the functionality of various servers and other components that implement the directory storage service and/or storage services/systems described herein). The various methods as illustrated in the figures and described herein represent example embodiments of methods. The order of any method may be changed, and various elements may be added, reordered, combined, omitted, modified, etc.

Figure 11:
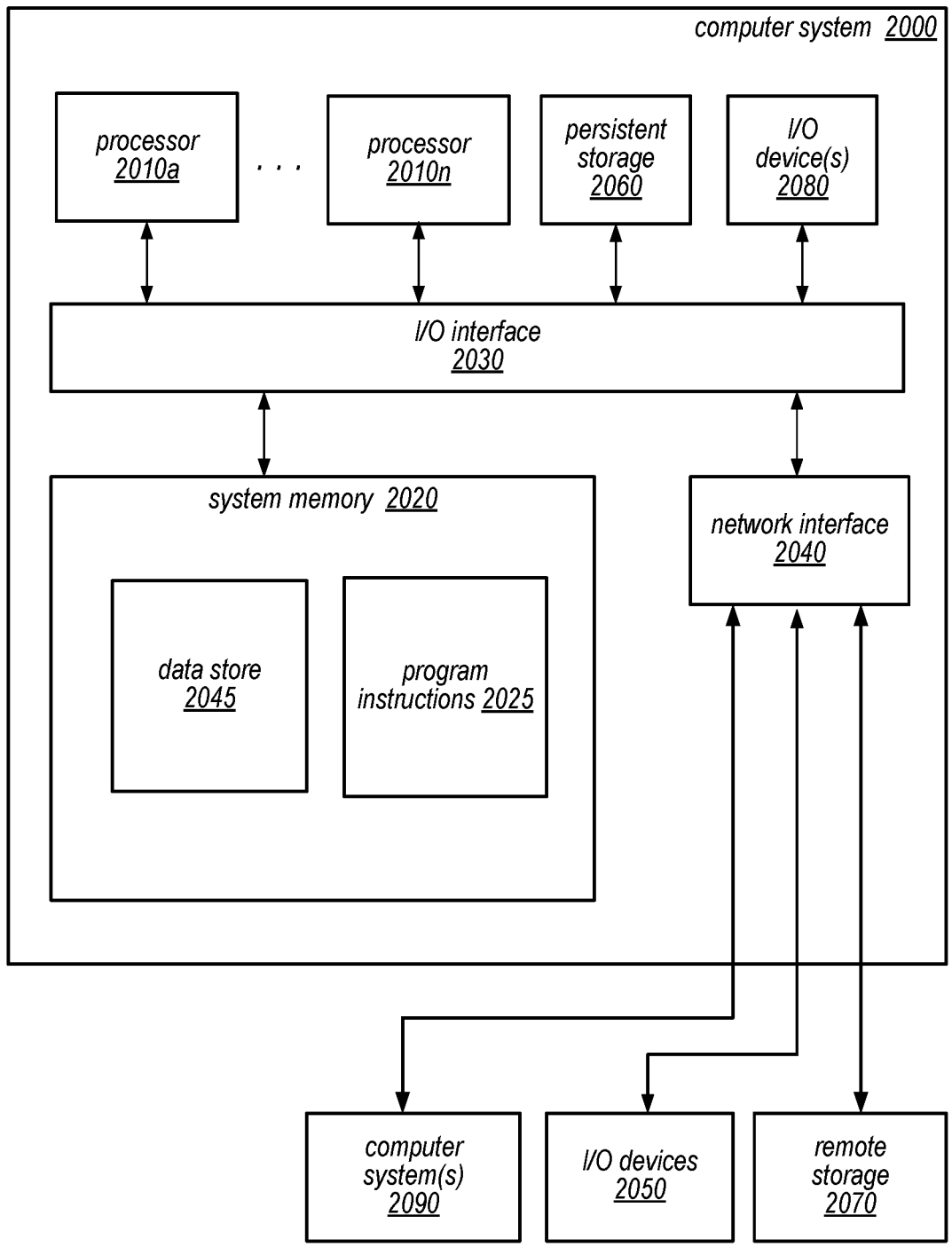
FIG. 11 is an example computer system, according to various embodiments.

FIG. 11 is a block diagram illustrating a computer system that can implement providing a consistent view of associations between independently replicated data objects, according to various embodiments, as well as various other systems, components, services or devices described above. For example, computer system 2000 may implement storage nodes that maintain graph data structures that include index objects that can be accessed to perform queries with respect to the graph data structure, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the directory storage systems described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that can store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a storage nodes that store graph data structures, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/DIRECTORY STORAGE SERVICE 220-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be implemented as described herein. For example, the information described herein as being stored by the storage nodes described herein may be stored in data store 2045 or in another portion of system memory 2020 on one or more nodes, in persistent storage 2060, and/or on one or more remote storage devices 2070, at different times and in various embodiments. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems 2090 (which may implement embodiments described herein), for example. In addition, network interface 2040 may allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 11 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a database engine head node within the database tier of a database system may present database services and/or other types of data storage services that employ the distributed storage systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
 a memory to store program instructions which, if performed by at least one processor, cause the at least one processor to perform a method to at least:
  replicate updates to a first data store to a copy of the first data store independent of updates to a second data store that are replicated to a copy of the second independent data store;
  receive a request to store a reference that associates a first object stored in a first data store with a second object stored in a second data store;
  determine that the copy of the second data store does not include the second object; and
  responsive to the determination, store the reference and the second object in the first data store to be replicated together to the copy of the first data store.

2. The system of claim 1, wherein the method further causes the at least one processor to:
 receive a request to store a reference that associates a third object stored in the first data store with a fourth object stored in the second data store;
 determine that the copy of the fourth data store does include the second object; and
 responsive to the determination, store the reference that associates the third object stored in the first data store with the fourth object stored in the second data store to be replicated to the copy of the first data store without replicating the fourth object.

3. The system of claim 1,
 wherein the second object is stored in the copy of the first data store;
 wherein the program instructions cause the at least one processor to perform the method to at least:
  responsive to an evaluation of replication state that determines that the second object is included in the copy of the second data store, remove the second object from the first data store and the copy of the first data store.

4. The system of claim 1, wherein the first data store and the second data store are hosted as part of one or more network-based storage services implemented in first region of a provider network and wherein the copy of the first data store and the copy of the second data store are hosted in the one or more network-based storage services in a second region of the provider network.

5. A method, comprising:
 receiving a request to store a reference that associates a first object stored in a first data store with a second object stored in a second data store, wherein updates to the first data store are replicated to a copy of the first data store independent of updates to the second data store that are replicated to a copy of the second data store; and responsive to a determination that the copy of the second data store does not include the second object, storing the reference and the second object in the first data store to be replicated together to the copy of the first data store.

6. The method of claim 5, further comprising:

responsive to a request to store the second object at the second data store received before the request to store the reference, storing the second object in the second data store to be replicated to the copy of the second data store.

7. The method of claim 6, wherein the determination that the copy of the second data store does not include the second object comprises an evaluation of replication state for the copy of the second data store; and wherein the method further comprises:
after replicating the second object to the copy of the second data store, updating the replication state to indicate that the copy of the second data store includes the second object.

8. The method of claim 6, wherein the second object is stored in the copy of the first data store;

responsive to an evaluation of the replication state that determines that the second object is included in the copy of the second data store, removing the second object from the first data store and the copy of the first data store.

9. The method of claim 8, further comprising:

receiving a request to return an object associated with the first object at the copy of the first data store;

determining that the second object is noted stored at the copy of the first data store; and responsive to determining that the second object is noted stored at the copy of the first data store, returning the reference that associates the first object with the second object stored in the copy of the second data store.

10. The method of claim 5, further comprising:

receiving a request to return an object associated with the first object at the copy of the first data store;

determining that the second object is stored at the copy of the first data store; and responsive to determining that the second object is stored at the copy of the first data store, returning the second object and the reference that associates the first object with the second object.

11. The method of claim 5, further comprising responsive to a determining that the copy of the second data store does include the second object, sending an indication that the copy of the second data store includes the second object.

12. The method of claim 5, further comprising:

receiving a request to store a reference that associates a third object stored in the first data store with a fourth object stored in the second data store;

responsive to determining that the copy of the fourth data store does include the second object, storing the reference that associates the third object stored in the first data store with the fourth object stored in the second data store to be replicated to the copy of the first data store without replicating the fourth object.

13. The method of claim 5, wherein the first data store and the second data store are hosted as part of network-based directory storage service implemented in first region of a provider network, wherein the copy of the first data store and the copy of the second data store are hosted in the network-based directory storage service in a second region of the provider network, and wherein the request to associate the first object with the second object is a request to attach the first object to the second object.

14. A non-transitory, computer-readable storage medium, storing program instructions that when executed by one or more computing devices cause the one or more computing devices to implement:

receiving a request to store a reference that associates a first object stored in a first data store with a second object stored in a second data store, wherein updates to the first data store are replicated to a copy of the first data store independent of updates to the second data store that are replicated to a copy of the second data store; and determining that the copy of the second data store does not include the second object; and responsive to the determination, storing the reference and the second object in the first data store to be replicated together to the copy of the first data store.

15. The non-transitory, computer-readable storage medium of claim 14, wherein the program instructions cause the one or more computing devices to further implement:

receiving a request to return an object associated with the first object at the copy of the first data store;

determining that the second object is stored at the copy of the first data store; and responsive to determining that the second object is stored at the copy of the first data store, returning the second object and the reference that associates the first object with the second object.

16. The non-transitory, computer-readable storage medium of claim 14, wherein the program instructions cause the one or more computing devices to further implement:

responsive to a request to store the second object at the second data store received before the request to store the reference, storing the second object in the second data store to be replicated to the copy of the second data store.

17. The non-transitory, computer-readable storage medium of claim 16, wherein the determination that the copy of the second data store does not include the second object comprises an evaluation of replication state for the copy of the second data store; and wherein the program instructions cause the one or more computing devices to further implement:
after replicating the second object to the copy of the second data store, updating the replication state to indicate that the copy of the second data store includes the second object.

18. The non-transitory, computer-readable storage medium of claim 16, wherein the second object is stored in the copy of the first data store;

wherein the program instructions cause the one or more computing devices to further implement:
responsive to an evaluation of the replication state that determines that the second object is included in the copy of the second data store, removing the second object from the first data store and the copy of the first data store.

19. The non-transitory, computer-readable storage medium of claim 18, wherein the program instructions cause the one or more computing devices to further implement:

wherein updates to the first data store are replicated to a second copy of the first data store independent of updates to the second data store that are replicated to second copy of the second data store;

wherein the second object is stored in the second copy of the first data store;

wherein the program instructions cause the one or more computing devices to further implement:

responsive to an evaluation of replication state for the second copy of the second data store that determines that the second object is included in the second copy of the second data store, removing the second object from the second copy of the first data store.

20. The non-transitory, computer-readable storage medium of claim 14, wherein the first data store is a first type of data store and wherein the second data store is a second type of data store.

* * * * *